United States Patent
Collardey et al.

(10) Patent No.: US 7,247,260 B2
(45) Date of Patent: Jul. 24, 2007

(54) METHOD FOR PREPARING A SEMI-CONDUCTIVE CERAMIC MATERIAL, SEMI-CONDUCTIVE CERAMIC MATERIAL AND IGNITION PLUG USING THIS CERAMIC MATERIAL

(75) Inventors: François Collardey, Vermondans (FR); Aurélien Jankowiak, Ostwald (FR); Philippe Blanchart, Limoges (FR); Dominique Laigneau, Angouleme (FR)

(73) Assignee: ECET–Europeene de Conception et d'Etudes Technologiques, Maisons Alfort (FR)

( * ) Notice: Subject to any disclaimer, the term of this patent is extended or adjusted under 35 U.S.C. 154(b) by 455 days.

(21) Appl. No.: 10/963,537

(22) Filed: Oct. 14, 2004

(65) Prior Publication Data

US 2006/0003091 A1 Jan. 5, 2006

(30) Foreign Application Priority Data

Oct. 15, 2003 (FR) .................................. 03 12043

(51) Int. Cl.
*H01B 1/08* (2006.01)
(52) U.S. Cl. ................... 252/521.1; 252/520.5; 264/104
(58) Field of Classification Search ............ 252/520.5, 252/521.1; 264/104; 338/22 R
See application file for complete search history.

(56) References Cited

U.S. PATENT DOCUMENTS 4,260,872 A 4/1981 Brodmann et al.
6,632,381 B2 10/2003 Sugimoto

FOREIGN PATENT DOCUMENTS

JP 04-108667 * 4/1992

OTHER PUBLICATIONS

Duvigneaud et al "Factors Affecting the Sintering and the Electrical Properties of Sr-Doped LaCrO3", Journal of the European Ceramic Society 14(1994) 359-367.*

* cited by examiner

*Primary Examiner*—Mark Kopec
(74) *Attorney, Agent, or Firm*—Young & Thompson

(57) ABSTRACT

Method for preparing a semi-conductive ceramic material, wherein:
in a receptacle containing a liquid, there are mixed from 30 to 90% of a conductive phase based on $Z_{1-x}M_xCrO_3$ for $0 \leq x \leq 0.3$, with Z being an element of the lanthanide group or a mixture of elements of this type, and M being calcium, strontium, magnesium, aluminum, titanium, yttrium or a mixture of two or more of these elements; from 8 to 60% of an insulating phase based on fine grains of alumina or tabular alumina or mullite or a mixture of two or more of these compounds; and from 0 to 10% of sintering additives; operations are carried out for milling, drying and sieving this mixture;
this mixture is pressed;
and this mixture is sintered in order to obtain a ceramic material having a porosity less than or equal to 25%.

12 Claims, 2 Drawing Sheets

METHOD FOR PREPARING A SEMI-CONDUCTIVE CERAMIC MATERIAL, SEMI-CONDUCTIVE CERAMIC MATERIAL AND IGNITION PLUG USING THIS CERAMIC MATERIAL

The invention relates to the field of ignition plugs and more particularly that of semi-conductive ceramic materials which are used in the production of ignition plugs of the high-energy, low-voltage type.

It should be noted that ignition plugs, in particular for turbines and jet engines, can be of two types:

ignition plugs of the high-energy, high-voltage type (HEHV), whose operating voltage is in the order of 20 kV;

ignition plugs of the high-energy, low-voltage type (HELV) whose operating voltage is in the order of from 2 to 3 kV;

they are capable of providing an energy of from a few tenths of a Joule to several Joules.

The high-energy, low-voltage ignition plugs comprise a semi-conductive material, such as a cermet, between the electrodes thereof so that the application of sufficient voltage between these electrodes leads to the creation of a spark.

The behaviour of the material during the different phases of the spark has been analysed and found to be as follows:

Firstly, the semi-conductive ceramic material is active during the ionisation phase which corresponds to an accumulation of charges on the surface of the material. The initiation phase then follows which itself corresponds to an intermediate phase during which there is a gradual propagation of micro-arcs on the surface. Finally, the spark phase follows, during which the semi-conductive ceramic material is inactive but is subjected to significant mechanical and thermal stresses brought about by the passage of the spark.

The advantages of high-energy, low-voltage ignition plugs are firstly linked to the operation thereof which is only slightly dependent on the conditions in the combustion chamber (re-ignition at high pressure) and secondly to the more compact ignition chain which it is sufficient to assemble to ensure the operation thereof. It is these advantages which have led to the development of semi-conductors based on silicon carbide which are described in particular in documents U.S. Pat. No. 5,028,346 and FR-A-2 346 881. These semi-conductors also contain a base insulating phase, for example, of silicon nitride and modified silicon oxynitride, or silica, alumina and alkaline-earth oxide.

However, the reason that these systems are not in general use in engines is because the useful life of an ignition plug of the semi-conductive type becomes greatly reduced when used in harsh conditions, that is to say, at high pressures and high temperatures combined with chemical influences linked to the type of fuel used.

The useful life of ignition plugs is limited, in the case of high-energy, high-voltage ignition plugs, by wear of the electrodes. In the existing high-energy, low-voltage ignition plugs, the wear of the semi-conductor and oxidation of the silicon carbide occur substantially before the wear of the electrodes and it is these factors which limit the useful life of the ignition plug.

The object of the invention is to increase the useful life and the reliability of semi-conductor ignition plugs of the high-energy, low-voltage type.

To this end, the subject-matter of the invention is a method for preparing a semi-conductive ceramic material, characterised in that:

in a receptacle containing a liquid, there are mixed from 30 to 90% by weight of a conductive phase based on $Z_{1-x}M_xCrO_3$ for $0 \leq x \leq 0.3$, with Z being able to be an element of the lanthanide group or a mixture of elements of this type, and M being able to be calcium, strontium, magnesium, aluminium, titanium, yttrium or a mixture of two or more of these elements; from 8 to 60% by weight of an insulating phase based on fine grains of alumina or tabular alumina or mullite or a mixture of two or more of these compounds; and from 0 to 10% by weight of sintering additives;

operations are carried out for milling, drying and sieving this mixture;

this mixture is pressed;

and this mixture is sintered in order to obtain a ceramic material having a porosity less than or equal to 25%.

Z is preferably lanthanum.

The porosity of the ceramic material obtained is preferably between 0 and 15%.

One or more plasticising compounds are preferably added to the mixture and a de-binding operation is carried out after the pressing and before the sintering.

The milling is preferably carried out in two steps, the addition of the plasticising agent being effected between the two steps, and the second milling step being less energetic than the first step.

The sintering additives are preferably selected from silicates (for example, talc, bentonite), alkaline and alkaline-earth oxides $Na_2O$, $K_2O$, BaO, CaO, MgO, alkaline-earth carbonates $BaCO_3$, $CaCO_3$, $MgCO_3$, dolomite, thermoemissive compounds, such as barium titanate $BaTiO_3$, rare earth compounds, such as lanthanum oxide, yttrium oxide and compounds containing transition metals, or a mixture of these compounds.

The subject-matter of the invention is also a semi-conductive ceramic material, characterised in that it comprises from 30 to 90% by weight of a conductive phase based on $Z_{1-x}M_xCrO_3$ for $0 \leq x \leq 0.3$, Z being able to be an element of the lanthanide group or a mixture of elements of this type, and M being able to be calcium, strontium, magnesium, aluminium, titanium, yttrium or a mixture of two or more of these compounds; from 8 to 60% by weight of an insulating phase based on alumina or mullite or a mixture of these compounds or the high temperature reaction products thereof; and from 0 to 10% by weight of sintering additives or the high temperature reaction products thereof, and in that the porosity thereof is less than or equal to 25%.

Z is preferably lanthanum.

The porosity of the ceramic material is preferably between 0 and 15%.

The sintering additives are preferably selected from silicates, alkaline and alkaline-earth oxides $Na_2O$, $K_2O$, BaO, CaO, MgO, alkaline-earth carbonates $BaCO_3$, $CaCO_3$, $MgCO_3$, dolomite, thermoemissive compounds, such as barium titanate, rare earth compounds, such as lanthanum oxide and compounds containing transition metals, such as yttrium oxide, or a mixture of these compounds.

The subject-matter of the invention is also an ignition plug of the high-energy, low-voltage type comprising a semi-conductive ceramic material between the electrodes thereof, characterised in that the ceramic material is of the above type.

As will have been appreciated, the invention first consists in using, as a conductive phase, a compound of the type $Z_{1-x}M_xCrO_3$ with $0 \leq x \leq 0.3$. Z is an element of the lanthanide group or a mixture of elements of this type. Lanthanum is a preferred example. M (the presence of which is optional) can be calcium, strontium, magnesium, aluminium, titanium, yttrium.

These compounds have particularly significant mechanical and electrical characteristics. In particular, they have a reduction in the volume resistivity with temperature. Above all, these properties are stable in very harsh operating conditions: temperatures of from −50 to 900° C., pressures of from 1 to 50 bar, presence of kerosene.

Typically, after sintering, the ceramic material contains compounds of the type $Al_xSi_yO_z$, with y being able to be equal to 0, lanthanide aluminate and optionally lanthanide silicate, $Z_{1-x}M_xCrO_3$, with M being able to be Ca, Sr, Mg, Al, Ti, Y or a mixture of several of these elements, and an amorphous phase based on oxygen and one or more elements from Al, Si, Ca.

In this manner, the semi-conductive element can withstand the significant stresses to which it is subjected during the ionisation phase (high pressure, high temperature, presence of chemical agents) and during the spark phase where the semi-conductor is passive but is subjected to thermal and mechanical shocks. These shocks lead to a loosening of the particles of SiC located in the vicinity of the inter-electrode surface in the case of the high-energy, low-voltage ignition plugs known from the prior art.

Furthermore, the semi-conductive ceramic material withstands prolonged exposures to high temperatures and high pressures whilst preserving the mechanical and electrical characteristics thereof, whereas the semi-conductors based on silicon carbide described in the prior art partially or completely lose the electrical characteristics thereof following prolonged exposures to high temperatures and high pressures, owing to oxidation of the silicon carbide.

With regard to the insulating phase, this is obtained during sintering from fine grains of alumina or tabular alumina or mullite $3Al_2O_3, 2SiO_2$ or a mixture of two or more of these compounds.

Sintering additives allow the sintering temperature to be reduced and optimum densification to be ensured, conferring on the ceramic material a high degree of hardness and good mechanical properties. The porosity of the ceramic material does not exceed 25% and is optimally between 0 and 15%.

As sintering additives, it is possible to use in particular (but not exclusively), alone or in combination, silicates (for example, talc, bentonite), alkaline and alkaline-earth oxides ($Na_2O$, $K_2O$, BaO, CaO, MgO), alkaline-earth carbonates ($BaCO_3$, $CaCO_3$, $MgCO_3$), dolomite, rare earth compounds, such as $La_2O_3$, transition metal compounds, such as yttrium oxide $Y_2O_3$, or barium titanate $BaTiO_3$ which is known to be a thermoemissive compound, or other thermoemissive compounds.

The respective proportions of the various compounds are, as a percentage by weight relative to the total of solid materials intended to remain in the final ceramic material:
from 30 to 90% for the materials which constitute the conductive phase;
from 8 to 60% for the materials which constitute the insulating phase;
from 0 to 10% for the sintering additives which are therefore not absolutely obligatory; furthermore, some of these additives can react with the other materials or decompose during sintering; it should be noted that this content of from 0 to 10% relates both to the additives which are found in an identical state in the final ceramic material and the high temperature reaction products of these additives.

Generally, after sintering, the ceramic material contains compounds of the type $Al_xSi_yO_z$ (with y=0 if no mullite has been used), lanthanide aluminate and lanthanide silicate (if mullite has been used) for the insulating phase, $Z_{1-x}M_xCrO_3$ for the conductive phase, with M=Ca, Sr, Mg, Al, Ti, Y or a mixture of several of these elements, and an amorphous phase which principally contains oxygen and those of the elements Al, Si and Ca which have been introduced with the starting products.

The invention will be better understood from a reading of the description below, given with reference to the following appended Figures.

Figure 1:
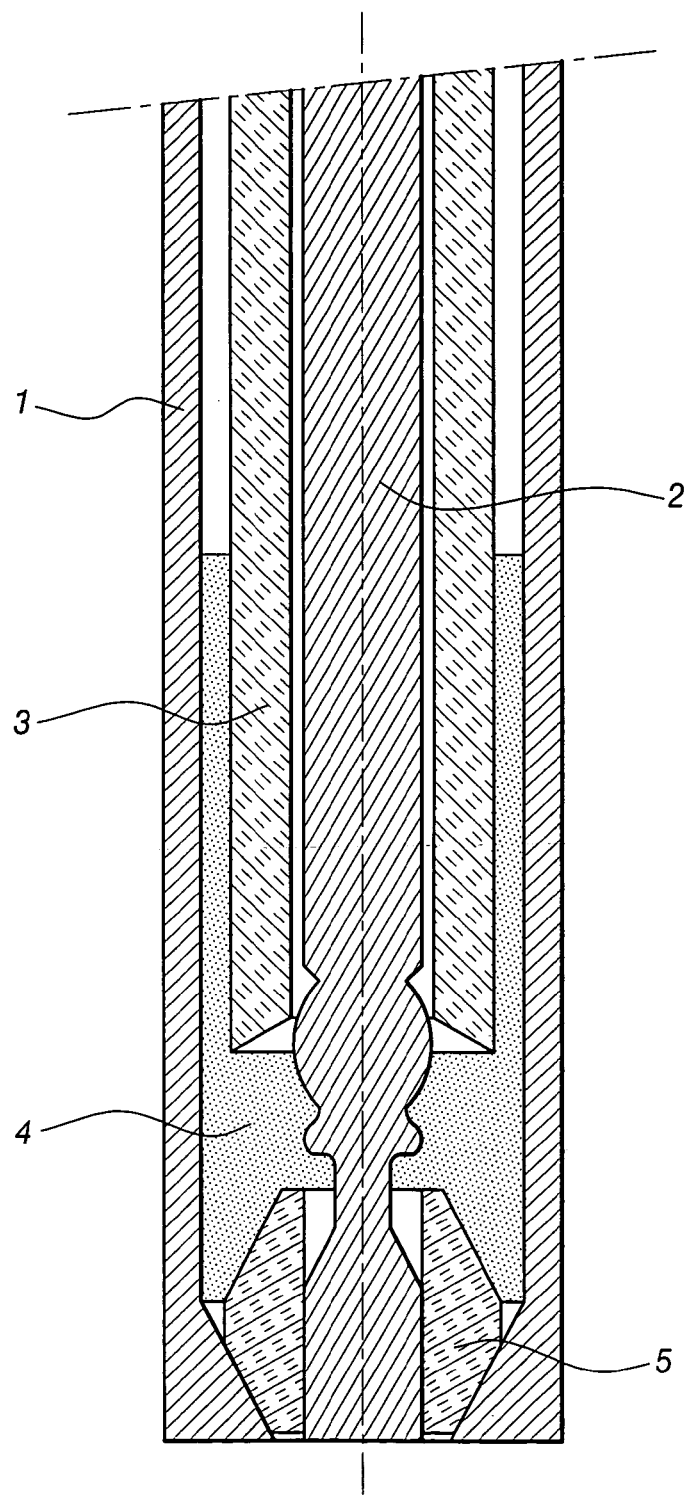
FIG. 1 is a schematic longitudinal section of a high-energy, low-voltage ignition plug.

FIG. 1 schematically illustrates the design of a high-energy, low-voltage ignition plug. This is composed of a tubular metal body 1 which constitutes the peripheral electrode and a central electrode 2. A ceramic sleeve 3 which is interposed between the two electrodes 1, 2 ensures that the central electrode is electrically insulated, except in the end region thereof where this insulation is ensured by a sealing glass or a cement 4 which also serves to mechanically retain and seal the assembly. A semi-conductive ceramic annular piece 5 is located at the end of the ignition plug and connects the ends of the two electrodes 1, 2. The invention is based on the semi-conductive ceramic material which constitutes this piece.

The four operating methods below can be cited as non-limiting examples of methods for preparing ceramic materials according to the invention.

EXAMPLE 1

During a first step, compounds added in the form of powders are mixed, preferably in two sub-steps.

In the first sub-step, 40 g of mullite ($3Al_2O_3, 2SiO_2$) and 10 g of $CaCO_3$ are placed into a jar. The jar contains 10 milling agents of a diameter of approximately 13 mm. 14 g of water subjected to osmosis, 0.18 g of DOLAPIX A88 (2-amino-2-methylpropanol) and 0.02 g of DOLAPIX Pc33 (polyacrylate) are added to the jar. These two compounds are dispersing agents. Liquid media other than water could be used, for example, alcohol, but other dispersing agents would then have to be used, those previously mentioned not being compatible with alcohol.

The mixture is then milled at a relatively high speed by the jar being placed in a planet wheel for 45 minutes. The intention is to break any clusters of powder and to effectively disperse the matrix. It would be possible to use a ball-type mill but it would take longer to obtain a homogeneous mixture (approximately 4 hours).

In a second sub-step, 150 g of lanthanum chromite $LaCrO_3$ of a mean granule size of 40 μm, and a solution containing 36 g of water subjected to osmosis, 5 g of PEG 600 are added to the jar. PEG 600 is a polyethylene glycol. This compound is a plasticising agent which facilitates the subsequent pressing step. The jar is then placed once more in the planet wheel and milling is carried out for 20 minutes at a moderate speed in order not to damage the plasticising agents. A milling operation which is too energetic would break the polymer chains which impart the resilient properties to the products. This is also the reason for which the plasticising agents are introduced into the mixture only after the first milling step, since it is energetic.

The mixture obtained is then dried in an oven at 70° C. for 20 hours in order to eliminate the water from the mixture.

The slab which is produced is milled using a mortar. The powder obtained is sieved using a 500 μm sieve.

The powder which has passed through the sieve is subjected to a pressing operation in two steps: uniaxial pressing in a mould having a diameter of 13 mm in order to produce a preform, then isostatic pressing in a chamber at 2000 bar.

The preforms are then subjected to a de-binding operation in air, argon or a vacuum, depending on the circumstances, at a maximum temperature of 700° C. for 3 days in order to burn the organic additives which are present in the preforms.

Finally, the preforms are placed in a graphite or alumina pot filled with alumina powder of more than 100 μm in order to be sintered therein at between 1350 and 1950° C. for a duration of from 30 minutes to 1 hour in air, nitrogen or argon.

The de-binding cycle used is as follows:

increase to 600° C. at 0.2° C./mn, plateau for 5 hours at 600° C., decrease to ambient temperature at 10° C./mn.

The sintering cycle used in this example is as follows:

increase to 1550° C. at 10° C./mn, plateau for 60 nm at 1550° C., decrease to 20° C. at 60° C./mn.

A ceramic material is obtained having the composition:

TABLE 1

Composition of ceramic materials obtained according to example 1

|  | Mesh | Quantity |
|---|---|---|
| Synthetic triple cell mullite $Al_{4.75}Si_{1.25}O_{9.63}$ | Orthorhombic | from 8 to 20% |
| Lanthanum chromite $La_{0.7}Ca_{0.3}CrO_3$ doped with calcium | Orthorhombic | from 40 to 75% |
| Lanthanum silicate $La_{4.67}(SiO_4)_3O$ | Hexagonal | from 2 to 5% |
| Chromium oxide $CrO_2$ | Tetragonal | from 1 to 2% |
| Amorphous phase Si, Al, O, Ca |  | from 2 to 8% |

These results are obtained by means of RX diffraction with regard to the crystalline phases, and by means of chemical micrography using a scanning electron microscope for the amorphous phase.

The total porosity measured (open and closed) is 5%.

A ceramic material is obtained whose breakdown voltage when measured with a pulse generator, which includes a capacitance of 0.33 μF, is found to be 900V.

EXAMPLE 2

The same operating method is used as in example 1, with the exception that no $CaCO_3$ is added. The quantity of mullite is therefore brought to 44.24 g, the proportion of $LaCrO_3$ is 155.76 g. The de-binding is carried out at 600° C. in air, and the sintering is effected at 1450° C. for 30 minutes, also in air.

A ceramic material is obtained having the composition:

TABLE 2

Composition of ceramic materials obtained according to example 2

|  | Mesh | Quantity |
|---|---|---|
| Synthetic mullite $Al_{4.75}Si_{1.25}O_{9.63}$ | Orthorhombic | from 8 to 20% |
| Lanthanum chromite $La_{0.7}Ca_{0.3}CrO_3$ doped with calcium | Orthorhombic | from 40 to 75% |
| Lanthanum silicate $La_{4.67}(SiO_4)_3O$ | Hexagonal | from 2 to 5% |
| Chromium oxide $CrO_2$ | Tetragonal | from 1 to 2% |
| Amorphous phase Si, Al, O, Ca |  | from 2 to 8% |

The total porosity measured is 2% (this value represents the open and closed porosity).

A ceramic material is obtained whose breakdown voltage when measured with a pulse generator, which includes a capacitance of 0.33 μF, is found to be 1000V.

EXAMPLE 3

The same operating method is used as for example 1, with the mullite being replaced by fine grains of alumina. The de-binding is effected in argon at 700° C., and the sintering at 1750° C.

The porosity of the ceramic material is between 5% and 10%.

A ceramic material is obtained whose breakdown voltage when measured with a pulse generator, which includes a capacitance of 0.33 μF, is found to be in the order of 1000V.

EXAMPLE 4

The same operating method is used as for example 1, the mullite being replaced by tabular alumina. The de-binding is effected at 600° C. in air, and the sintering at 1600° C., also in air.

The porosity of the ceramic material is between 5% and 10%.

A ceramic material is obtained whose breakdown voltage when measured with a pulse generator, which includes a capacitance of 0.33 μF, is found to be in the order of 1000V.

For these examples, the proportions of the various base compounds are summarised in table 3. The percentages are percentages by weight. The proportions of water and additives are given with reference to the weight of the other compounds of the mixture (dry material) which will be found in the final ceramic material, either in an unchanged state, or at least partially converted into the insulating phase.

TABLE 3

Proportions of base compounds used in examples 1 to 4

|  | Example 1 (%) | Example 2 (%) | Example 3 (%) | Example 4 (%) |
|---|---|---|---|---|
| $Al_2O_{3\,finegrains}$ |  |  | 40 |  |
| $Al_2O_{3\,tabular}$ |  |  |  | 40 |
| $CaCO_3$ | 5 |  |  |  |
| Mullite | 20 | 22.12 |  |  |
| $LaCrO_3$ | 75 | 77.88 | 60 | 60 |
| A88 | 0.09 | 0.09 | 0.09 | 0.09 |
| Pc33 | 0.01 | 0.01 | 0.01 | 0.01 |
| $H_2O$ | 25 | 25 | 25 | 25 |

It must be appreciated that the details of the operating methods for producing the ceramic materials according to the invention can deviate from the examples which have been described. The most important aspect is that, in the end, a ceramic material is obtained which has the required composition and porosities. In particular, it is possible to dispense with the uniaxial pressing operation and only to carry out isostatic pressing of the powder.

Figure 2:
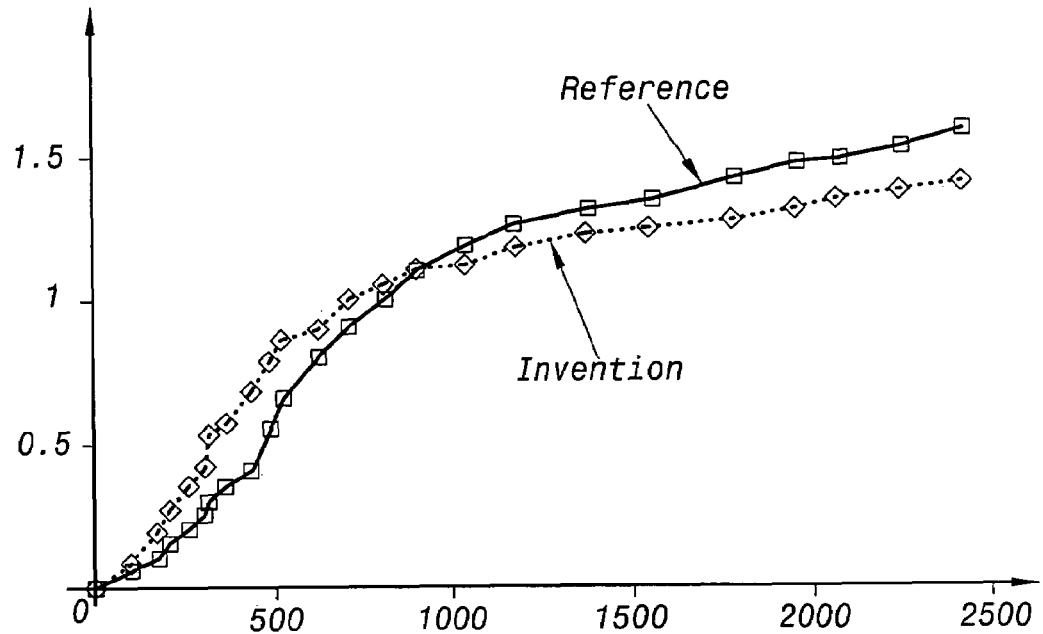
FIG. 2 illustrates the mean wear of the ceramic material relative to the peripheral electrode, expressed in mm, as a function of time, expressed in equivalent engine hours, for a reference ignition plug and an ignition plug according to the invention.
Figure 3:
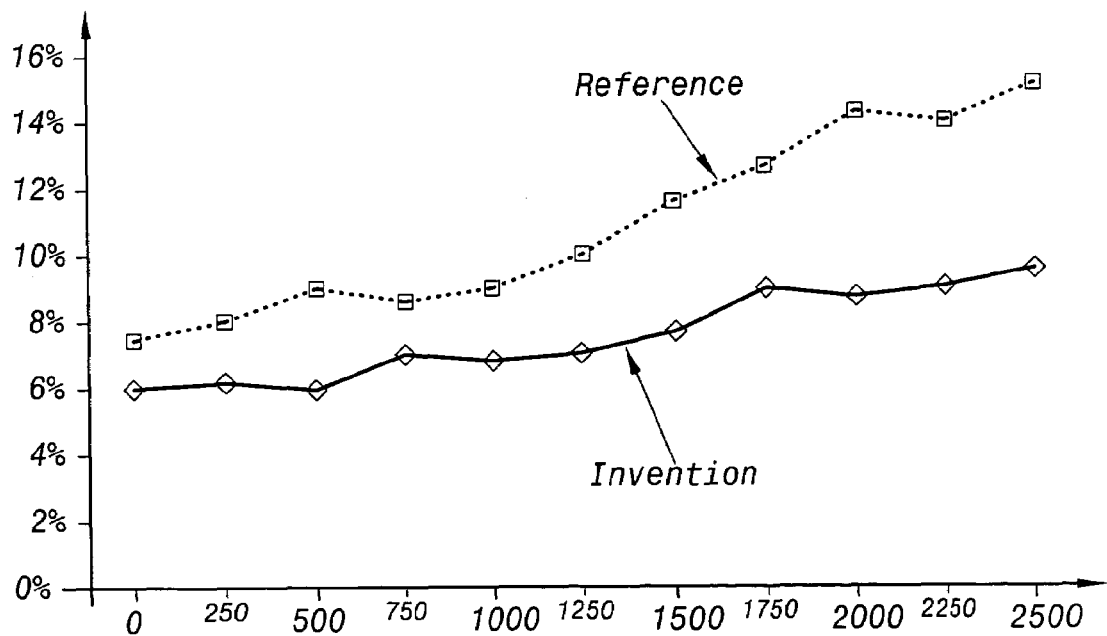
FIG. 3 illustrates the progression of the percentage of misfired sparks as a function of time, expressed in equivalent engine hours, for a reference ignition plug and an ignition plug according to the invention.

FIGS. 2 and 3 set out the results obtained during endurance tests with kerosene being sprayed.

Two ignition plugs are used, the first of which is mounted with a reference semi-conductive ceramic material which is representative of the prior art according to document U.S. Pat. No. 5,028,346 and which contains silicon carbide, silicon nitride and modified silicon oxynitride containing from 54 to 65% of SiC, from 29 to 40% of silicon nitride and from 8 to 22% of modified silicon oxynitride, and the second with a semi-conductive ceramic material according to example 1 of the invention previously described, and which are otherwise identical.

The ignition circuit includes a capacitance of 0.33 µF, the frequency of the kerosene sprays is 1 Hz and the frequency of the pulses is 6 Hz. The breakdown voltage of the two plugs is found to be 900V.

FIG. 2 indicates the mean wear depth of the ceramic material relative to the peripheral electrode (expressed in mm), as a function of time, expressed in equivalent engine hours.

The measured wear of the semi-conductive ceramic material of the prior art is greater than that measured on the semi-conductive ceramic material according to the invention.

Furthermore, the breakdown voltage measured at the end of the test (approximately 2500 equivalent engine hours) increases to 1400V for the semi-conductive ceramic material of the prior art, whilst it remains at 1000V for the semi-conductive ceramic material according to the invention.

FIG. 3 illustrates the progression of the percentage of misfired sparks as a function of time expressed in equivalent engine hours.

The improvement in the ratio of successful ignitions with the ceramic material according to the invention allows the operational potential of the ignition plug to be increased.

Table 4 illustrates the progression of the breakdown voltage $V_c$ of the semi-conductive ceramic material produced according to the prior art previously described, and another semi-conductive ceramic material produced according to example 1 of the invention during an ageing temperature test.

TABLE 4

Progression of the breakdown voltage during an ageing temperature test

|  | Vc in ambient conditions | Vc after 100 h of exposure to 1000° C. |
|---|---|---|
| Ceramic material of the prior art | 900 V | 2500 V |
| Ceramic material according to the invention | 900 V | 900 V |

After being exposed to 1000° C. for 100 hours, it was found that the breakdown voltage of the ceramic material according to the prior art deviates very significantly whilst the breakdown voltage of the ceramic material according to the invention remains stable. This performance allows this ceramic material to be used in turbines having a very high operating temperature.

By combining these results, the low percentage of misfirings and stability at high temperature, the ceramic material according to the invention can be used in continuous-combustion engines.

The invention claimed is:

1. Method for preparing a semi-conductive ceramic material, characterised in that:

in a receptacle containing a liquid, there are mixed from 30 to 90% by weight of a conductive phase based on $Z_{1-x}M_xCrO_3$ for $0 \leq x \leq 0.3$, with Z being able to be an element of the lanthanide group or a mixture of elements of this type, and M being able to be calcium, strontium, magnesium, aluminium, titanium, yttrium or a mixture of two or more of these elements; from 8 to 60% by weight of an insulating phase based on fine grains of alumina or tabular alumina or mullite or a mixture of two or more of these compounds; and from 0 to 10% by weight of sintering additives;

operations are carried out for milling, drying and sieving this mixture;

this mixture is pressed;

and this mixture is sintered in order to obtain a ceramic material having a porosity less than or equal to 25%.

2. Method according to claim 1, characterised in that Z is lanthanum.

3. Method according to claim 1, characterised in that the porosity of the ceramic material obtained is between 0 and 15%.

4. Method according to claim 1, characterised in that one or more plasticising compounds are added to the mixture and in that a de-binding operation is carried out after the pressing and before the sintering.

5. Method according to claim 4, characterised in that the milling is carried out in two steps, in that the addition of the plasticising agent is effected between the two steps, and in that the second milling step is less energetic than the first step.

6. Method according to claim 1, characterised in that the sintering additives are selected from silicates, alkaline and alkaline-earth oxides $Na_2O$, $K_2O$, BaO, CaO, MgO, alkaline-earth carbonates $BaCO_3$, $CaCO_3$, $MgCO_3$, dolomite, rare earth compounds, such as $La_2O_3$, transition metal compounds, such as $Y_2O_3$, thermoemissive compounds, such as $BaTiO_3$, or a mixture of these compounds.

7. Semi-conductive ceramic material, characterised in that it comprises from 30 to 90% by weight of a conductive phase based on a compound of the type $Z_{1-x}M_xCrO_3$ for $0 \leq X \leq 0.3$, Z being able to be an element of the lanthanide group or a mixture of elements of this type, and M being able to be calcium, strontium, magnesium, aluminium, titanium, yttrium or a mixture of two or more of these elements, from 8 to 60% by weight of an insulating phase based on alumina or mullite or a mixture of these compounds or the high temperature reaction products thereof, and from 0 to 10% by weight of sintering additives or the high temperature reaction products thereof, and in that the porosity thereof is less than or equal to 25%.

8. Ceramic material according to claim 7, characterised in that Z is lanthanum.

9. Semi-conductive ceramic material according to claim 8, characterised in that the porosity thereof is between 0 and 15%.

10. Semi-conductive ceramic material according to claim 7, characterised in that the sintering additives are selected from silicates, alkaline-earth oxides BaO, CaO, MgO, Na$_2$O, K$_2$O, alkaline-earth carbonates BaCO$_3$, CaCO$_3$, MgCO$_3$, dolomite, rare earth compounds, such as La$_2$O$_3$, transition metal compounds, such as Y$_2$O$_3$, thermoemissive compounds, such as BaTiO$_3$, or a mixture of these compounds.

11. Semi-conductive ceramic material according to claim 7, characterised in that, after sintering, it contains compounds of the type Al$_x$Si$_y$O$_z$, with y being able to be equal to 0, lanthanide aluminate and optionally lanthanide silicate, Z$_{1-x}$M$_x$CrO$_3$, with M being able to be Ca, Sr, Mg, Al, Ti, Y or a mixture of several of these elements, and an amorphous phase based on oxygen and one or more elements from Al, Si, Ca.

12. Ignition plug of the high-energy, low-voltage type comprising a semi-conductive ceramic material between the electrodes thereof, characterised in that the ceramic material is of the type according to claim 7.

* * * * *